United States Patent [19]

Kanda

[11] Patent Number: 4,691,357
[45] Date of Patent: Sep. 1, 1987

[54] STEREOPHONIC RECEIVING CIRCUIT PROVIDING IMPROVED SWITCHING CHARACTERISTICS BETWEEN STEREOPHONIC AND MONAURAL MODES

[75] Inventor: Nobuo Kanda, Saitama, Japan

[73] Assignee: Pioneer Electronic Corporation, Tokyo, Japan

[21] Appl. No.: 743,461

[22] Filed: Jun. 11, 1985

[51] Int. Cl.$^4$ .............................................. H04H 5/00
[52] U.S. Cl. ........................................ 381/10; 381/13; 455/246
[58] Field of Search ............................. 381/10, 11, 13; 455/138, 232, 246, 251

[56] References Cited

U.S. PATENT DOCUMENTS 4,063,039 12/1977 Endres et al. ......................... 381/10
4,620,315 10/1986 Imagawa ............................... 381/10

OTHER PUBLICATIONS

Data Sheet for CA3089 (RCA Integrated Circuits Catalog) 1976.

*Primary Examiner*—Forester W. Isen
*Attorney, Agent, or Firm*—Sughrue, Mion, Zinn, Macpeak, and Seas

[57] ABSTRACT

A stereophonic receiving circuit in which automatic switchover from the monaural receiving mode to the stereophonic receiving mode as the input signal strength increases is made more smoothly and effectively by boosting the gradient of a S-meter control voltage above a certain level of the received signal. The conventional S-meter voltage is applied to one input of a differential amplifier, the other input of which receives a reference voltage. The output of the differential amplifier is applied to one input of an analog OR gate, the other input of which receives the S-meter voltage directly. The output of the analog OR circuit, which is the greater of the two inputs to the circuit, is applied to the control inputs of an electronic volume control circuit, a high-cut controller, and a stereophonic demultiplexer circuit.

4 Claims, 5 Drawing Figures

4,691,357

STEREOPHONIC RECEIVING CIRCUIT PROVIDING IMPROVED SWITCHING CHARACTERISTICS BETWEEN STEREOPHONIC AND MONAURAL MODES

BACKGROUND OF THE INVENTION

The present invention pertains to a stereophonic receiver circuit. More particularly, the present invention pertains to a sterephonic receiver circuit in which switching between stereophonic and monaural modes is carried out automatically in response to the level of the received signal. Yet more specifically, the invention pertains to such a receiver circuit having a reduced noise component in the reproduced output.

A conventional receiver circuit of the same general type to which the invention pertains is shown in the block diagram of FIG. 1. In FIG. 1, an output signal from an IF stage 1 is applied through an electronic volume control circuit 2, a noise canceller circuit 3, and a high-cut control circuit 4 to a stereophonic demodulator cirucit 5, the latter converting the processed IF signal to left-channel and right-channel output signals. The output of the IF stage 1 is also applied to a control voltage generator 6 which produces a so-called "S-meter" signal, the latter being applied to the electronic volume control circuit 2 to set the level of the signal passed to the stereophonic demodulator circuit 5, to the high-cut control circuit 4 for establishing the frequency at which cut-off occurs in the presence of noise, and to the stereophonic demodulator circuit 5 where it controls the operation of a separation control circuit in such a manner that, when noise is present in the received signal above a certain level, stereophonic separation is either defeated or reduced.

FIG. 2 is a graph showing the level of the S-meter voltage in response to changes in the electric field intensity of the signal received at the antenna terminals (not shown) of the receiver. From the zero level to a level S of the received signal, the S-meter voltage changes approximately linearly, while above the level of S, it is substantially constant.

In operation, when the level of the input signal falls below a level M, the stereophonic demodulator circuit 5 switches from the stereophonic receiving mode to the monaural receiving mode, and when the level of the received signal is again above the level S, stereophonic reception is restored.

It would be advantageous to restore the stereophonic receiving mode at a level S' of the received signal intermediate the levels M and S. However, if switching from monaural to stereophonic receiving were effected at the level of S' with the conventional circuit of FIG. 1, the voltage outputted by the control voltage generator 6 would be insufficient, thus requiring a higher-than-desired level of S to be reached before switching back to the stereophonic receiving mode.

SUMMARY OF THE INVENTION

Accordingly, it is an object of the present invention to eliminate the drawback mentioned above.

More specifically, it is an object of the present invention to provide a stereophonic receiving circuit in which a control voltage which controls an electronic volume control circuit, high-cut control circuit, and stereophonic demodulator circuit is at a sufficiently high level even if switching back to the sterephonic receiving mode is effected at a level of the received signal lower than that corresponding to the constant level of the S-meter voltage.

In accordance with the above and other objects, the present invention provides a sterephonic receiving circuit in which the control voltage level is made to follow two different characteristics, one below a predetermined critical level of the input signal and the other above that level.

More specifically, the invention provides a stereophonic receiver circuit including an IF section, an IF signal processing section, a stereophonic receiving circuit producing left- and right-channel signals in response to the processed IF signal, and a control voltage generator for producing a signal for controlling operations of the IF signal processing section and the stereophonic demodulator in response to an S-meter voltage produced by the IF section, wherein the improvement comprises means for amplifying the control voltage when the control voltage is above a predetermined value, and an analog OR gate for a passing to the IF signal processing section and the stereophonic demodulator circuit the greater of the control voltage and the output of the control voltage amplifying means.

DESCRIPTION OF THE PREFERRED EMBODIMENTS

Figure 1:
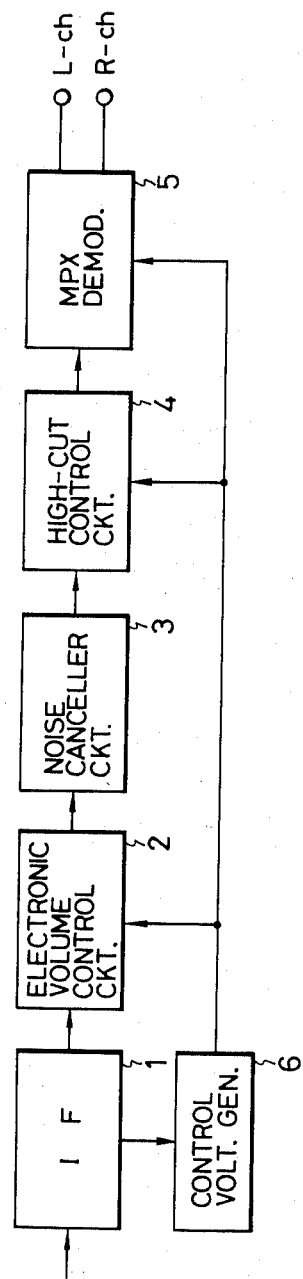
FIG. 1 is a block diagram of a conventional stereophonic receiver circuit of the same general type to which the invention pertains.
Figure 2:
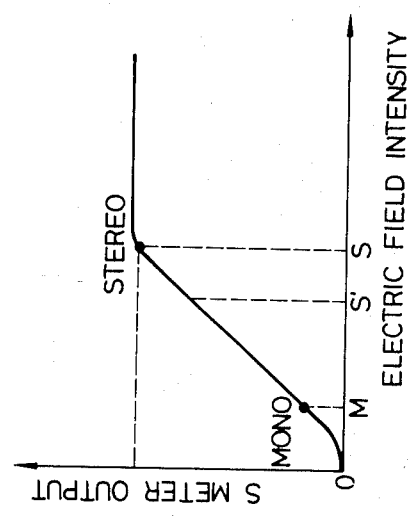
FIG. 2 is a graph showing the level of a S-meter output signal produced by the circuit of FIG. 1.
Figure 3:
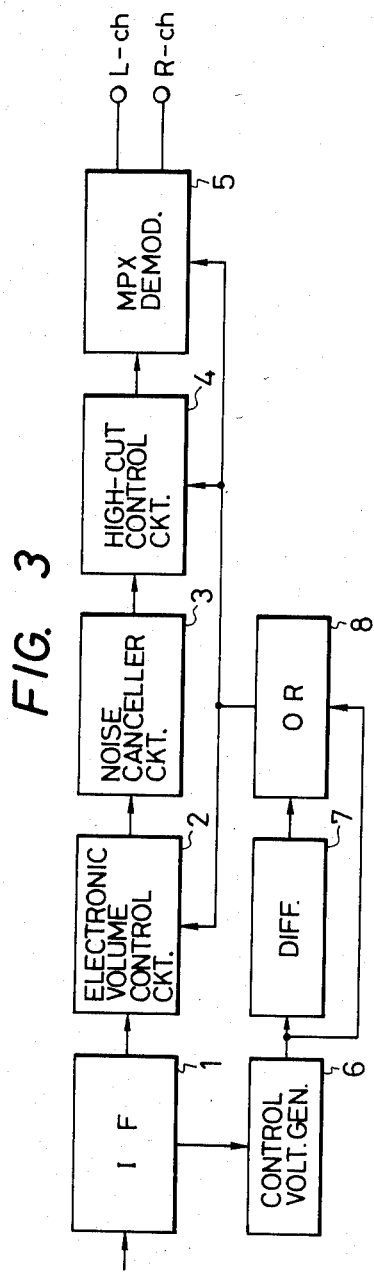
FIG. 3 is a block diagram of a stereophonic receiving circuit constructed in accordance with the present invention.

A preferred embodiment of a stereophonic receiving circuit of the invention is shown in the block diagram of FIG. 3. In FIG. 3, reference numerals used commonly in FIG. 1 denote like components.

In the circuit of FIG. 3, the S-meter voltage produced by the control voltage generator 6 is applied to a comparator-type differential circuit 7. The output of the differential circuit 7 and the output of the control voltage generator circuit are applied as the two inputs to an analog-type OR circuit 8. The output of the OR circuit 8, which is the input signal of the greater magnitude, is applied to the control inputs of the electronic volume control circuit 2, the high-cut controller circuit 4, and the demodulator circuit 5.

Figure 5:
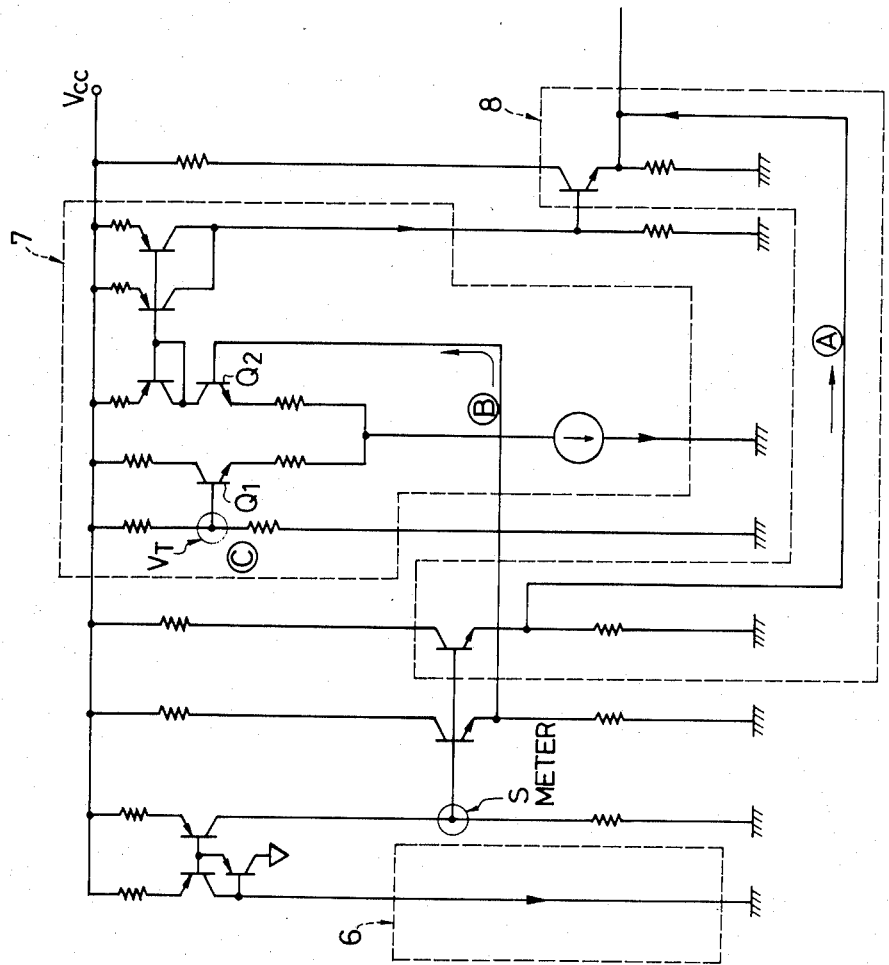
FIG. 5 is a schematic diagram of a differential circuit employed in the receiving circuit of FIG. 3.

The detailed construction of the differential circuit 7 is depicted in the schematic diagram of FIG. 5. The S-meter voltage is applied through a buffer transistor to the base of a transistor $Q_2$ forming a differential pair with a transistor $Q_1$. To the base of the transistor $Q_1$ is applied a reference voltage $V_T$ formed at the junction point of a voltage divider. When the S-meter voltage is smaller than $V_T$, the transistor $Q_1$ remains on, and the output of the circuit, provided at the output of a current-mirror circuit connected to the collector of the transistor $Q_2$, is a low level. On the other hand, when the S-meter voltage exceeds $V_T$, the transistor $Q_2$ is turned on, the transistor $Q_1$ turned off, and thus the output of the circuit is the S-meter voltage amplified.

Figure 4:
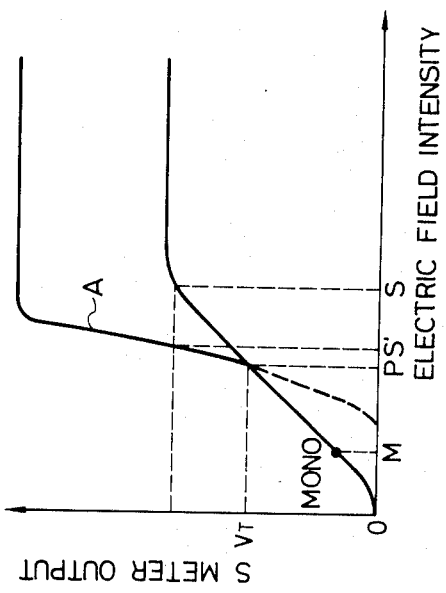
FIG. 4 is a graph similar to FIG. 2 but showing a control voltage produced by the stereophonic receiving circuit of FIG. 3.

Referring now to FIG. 4, the reference voltage $V_T$ is set to a level corresponding to a level P of the received signal, P being above the level M but below the levels S and S'. Accordingly, after the circuit has switched to the monaural receiving mode, when the level of the received signal is below P, the output of the control generator 6 is applied through the OR circuit to the electronic volume control circuit, high-cut control circuit 4, and stereophonic demodulator circuit 5, and hence the operation of the circuit is the same as in the case of FIG. 1. On the other hand, once the level of the received signal has increased from the point M in the monaural receiving mode to the point P, the differential circuit 7 outputs a voltage corresponding to the output of the control voltage generator 6 but amplified. Accordingly, upon switching to the stereophonic receiving mode at the point S', the level of the control signal applied to the electronic volume control circuit 2, the high-cut control circuit 4, and the stereophonic demodulator circuit 5 will be sufficient.

In the above described embodiment, the circuit which controls the gradient of the control voltage is described as being a differential circuit. However, other circuit configurations can be used as well.

In accordance with the stereophonic receiving circuit of the invention, because the control voltage is maintained at an appropriately high level at all times, switchover from monaural to stereophonic receiving is effected more smoothly than with conventional stereophonic receiving circuits.

I claim:

1. In a stereophonic receiving circuit in which a control voltage of a magnitude determined in accordance with the strength of a received signal is applied to control operations of an IF signal processing section including an electronic volume control circuit, a high-cut control circuit, and a stereophonic demodulator circuit, the improvement wherein said control voltage is generated by a circuit comprising: means for producing an S-meter voltage in response to an IF signal in said receiver; means for amplifying said S-meter signal only when said S-meter signal is above a predetermined level; and means for applying a greater one of said S-meter signal and an output of said amplifying means for controlling said operations of said electronic volume control circuit, said high-cut control circuit, and said stereophonic demodulator circuit.

2. The stereophonic receiving circuit of claim 1, wherein said amplifying means comprises a differential amplifier receiving said S-meter signal on one input thereof and a reference signal on the other input thereof.

3. The stereophonic receiving circuit of claim 1, wherein said applying means comprises an analog OR circuit.

4. The stereophonic receiving circuit of claim 2, wherein said reference signal is set to a level corresponding to a level of said S-meter signal corresponding to a level of said received signal less than that for which switchover from the monaural receiving mode to the stereophonic receiving mode occurs.

* * * * *